UNITED STATES PATENT OFFICE.

ARNOLD ERLENBACH AND KARL MARX, OF DESSAU, GERMANY, ASSIGNORS TO ACTIEN GESELLSCHAFT FÜR ANILIN FABRIKATION, OF BERLIN, GERMANY.

DYES FOR FURS, HAIRS, AND THE LIKE.

1,144,181.      Specification of Letters Patent.    Patented June 22, 1915.

No Drawing.    Application filed April 25, 1914. Serial No. 834,489.

*To all whom it may concern:*

Be it known that we, ARNOLD ERLENBACH and KARL MARX, subjects the former of the King of Bavaria and the latter of the Duke of Brunswick, residing the former at Schillerstrasse 5 and the latter at Albrechtstrasse 16, Dessau, Germany, our post-office addresses being the former Schillerstrasse 5 and the latter Albrechtstrasse 16, Dessau, Germany, have invented certain new and useful Improvements in New Dyes for Furs, Hairs, and the like, of which the following is a specification.

In a co-pending application, serially numbered 729,874, we have described and claimed new dyes for furs, hairs and the like which consists of or comprises an aromatic para-diamin of the general formula:

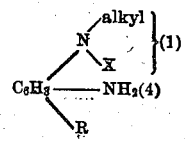

in which formula R and X mean univalent substituents and an aromatic meta-diamin of the general formula:

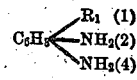

in which formula $R_1$ means an alkoxy group. Now it is important to offer these new dyes to the trade in a form ready for use which consists therefore in the present case of a mixture of the two components, the one being a free para-diamin and the other a free meta-diamin of the aromatic series. It is also well known that such bodies are easily oxidized by the oxygen of the atmospheric air, decomposition taking place; this decomposition occurs in a still shorter time if a para-diamin and a meta-diamin are mixed together.

Now it has been found that one can obtain the present new dyes in a very stable form and most adapted for the present purpose as well as for the dyeing process which they are to be applied for. This effect is attained by using both components, that is on the one hand the respective para-diamin and on the other hand the respective meta-diamin, in the form of a salt and more especially in the form of a salt of an inorganic acid, such as for instance hydrochloric acid or sulfuric acid.

The following examples serve to illustrate our invention, the parts being by weight:

1. 80 parts of para-aminodimethylanilin ½ sulfate $$(NH_2.C_6H_4.N(CH_3)_2.\tfrac{1}{2}H_2SO_4)$$

are thoroughly mixed with 60 parts of meta-diaminoanisol ½ sulfate $$((NH_2)_2.C_6H_3.OCH_3.\tfrac{1}{2}H_2SO_4)$$

in order to obtain a homogeneous mass. In dyeing a fur, being previously mordanted or not, the new dye is to be dissolved in water and the calculated quantity of an inorganic base, such as ammonium hydroxid, is to be added in order to produce the free bases from the components of the new dye; it is convenient to state that such a solution in order to serve as a dyebath must also contain further quantities of a suitable base and more especially of ammonium hydroxid and must also contain a suitable oxidizing agent, such as hydrogen peroxid. In this way there is obtained for instance on a fur and more especially on a fur mordanted with ferrous sulfate a fine and deep blue-black with a full sight overhand.

Accordingly as another mixture of the two above-named substances a mixture of 90 parts of para-aminodimethylanilin hydrochlorid and of 60 parts of meta-diaminoanisol sulfate may be given.

2. In order to obtain a new dye according to the present invention one may also proceed as follows: 80 parts of para-aminomonoethylanilin sulfate are incorporated with 50 parts of meta-diaminoanisol sulfate until a homogeneous mass is obtained. In order to perform the dyeing process with this new dye one may proceed according to the indications given in example 1; thus can be obtained on a fur mordanted with ferrous sulfate and using suitable proportions of the dye an intense bluish black of a great stability and of a full sight overhand.

It is obvious that our present invention is not limited to the foregoing examples or to the details given therein. Thus for instance instead of a para-aminodimethylanilin sulfate or hydrochlorid a para-aminodiethylanilin sulfate or hydrochlorid or instead of para-aminomonoethylanilin sulfate a hydrochlorid thereof or a sulfate or hydrochlorid of para-aminomonomethylanilin may be employed as well as a salt of a derivative of these amins containing a substituent attached to the benzene nucleus. Furthermore instead of meta-diaminoanisol sulfate a hydrochlorid of this base or a salt of meta-diaminophenetol may be used.

It is obvious that in preparing the new dyes according to our present invention from such diamins the proportions of the ingredients may be varied in order to obtain the best results, the special mixture for a new dye depending of course to a great extent upon the desired shade as well as upon the special nature of the furs, hairs, etc., to be dyed.

Having now described our invention and the manner in which it may be performed what we claim is,—

1. As new articles of manufacture new dyes for furs, hairs and the like comprising a salt of an aromatic para-diamin of the general formula:

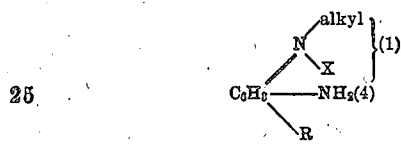

in which formula R and X mean univalent substituents and a salt of an aromatic meta-diamin of the general formula:

in which formula $R_1$ means an alkoxy group.

2. As new articles of manufacture new dyes for furs, hairs and the like comprising a salt of an aromatic para-diamin of the general formula:

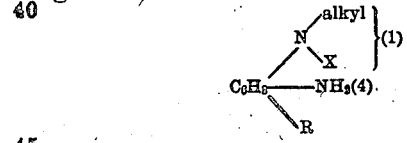

in which formula R means a univalent inorganic substituent and X means an univalent organic substituent, and a salt of an aromatic meta-diamin of the general formula:

in which formula $R_1$ means an alkoxy group.

3. As new articles of manufacture new dyes for furs, hairs and the like comprising a salt of an aromatic para-diamin of the general formula:

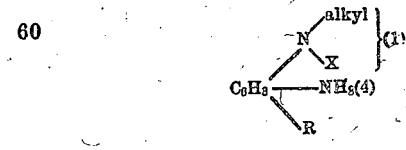

in which formula R means a hydrogen atom and X means an alkyl group and a salt of an aromatic meta-diamin of the general formula:

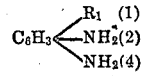

in which formula $R_1$ means an alkoxy group.

4. As new articles of manufacture new dyes for furs, hairs and the like comprising a salt of an aromatic para-diamin of the general formula:

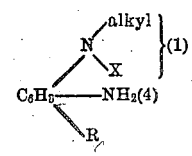

in which formula R means a hydrogen atom and X means a methyl group and a salt of an aromatic meta-diamin of the general formula:

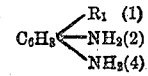

in which formula $R_1$ means an alkoxy group.

5. As new articles of manufacture new dyes for furs, hairs and the like comprising an inorganic salt of an aromatic para-diamin of the general formula:

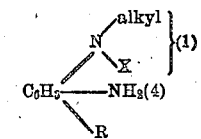

in which formula R means a hydrogen atom and X means a methyl group and an inorganic salt of an aromatic meta-diamin of the general formula:

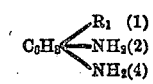

in which formula $R_1$ means an alkoxy group.

6. As a new article of manufacture a new dye for furs, hairs and the like comprising a salt of para-aminodimethylanilin and a salt of meta-diaminoanisol.

7. As a new article of manufacture a new dye for furs, hairs and the like comprising an inorganic salt of para-aminodimethylanilin and an inorganic salt of meta-diaminoanisol.

8. As a new article of manufacture a new dye for furs, hairs and the like comprising a para-aminodimethylanilin sulfate and a meta-diaminoanisol-sulfate, which new dye in the dry state when powdered is a gray blue to deep blue powder, easily soluble in water but difficultly soluble in alcohol and insoluble in ether, benzene and ligroin, and the aqueous solution of which possesses reddish color. which on the addition of fer ric chlorid or chromic acid turns to brown, and which aqueous solution brought upon filtering paper and when touching one of these oxidizing agents yields a dark brown coloration which at the outer portions turns within a short time to blue.

In testimony whereof we have hereunto set our hands in presence of two subscribing witnesses.

ARNOLD ERLENBACH.
KARL MARX.

Witnesses:
RUDOLPH FRICKE,
ALICE DUNGER.